US011878271B1

(12) United States Patent
Wei et al.

(10) Patent No.: US 11,878,271 B1
(45) Date of Patent: Jan. 23, 2024

(54) LOW-PRESSURE HIGH-FLUX HOLLOW FIBER NANOFILTRATION (NF) MEMBRANE, AND PREPARATION METHOD AND USE THEREOF

(71) Applicant: Harris Membrane Clean Technology Inc., Alhambra, CA (US)

(72) Inventors: Jiang Wei, Hangzhou (CN); Chulong Chen, Hangzhou (CN); Wei Feng, Hangzhou (CN)

(73) Assignee: HARRIS MEMBRANE CLEAN TECHNOLOGY INC., Alhambra, CA (US)

( * ) Notice: Subject to any disclaimer, the term of this patent is extended or adjusted under 35 U.S.C. 154(b) by 0 days.

(21) Appl. No.: 18/209,578

(22) Filed: Jun. 14, 2023

(30) Foreign Application Priority Data

Apr. 14, 2022 (CN) .......................... 202210390794.1

(51) Int. Cl.
| | |
|---|---|
| *B01D 61/02* | (2006.01) |
| *B01D 69/08* | (2006.01) |
| *B01D 71/66* | (2006.01) |
| *C02F 1/44* | (2023.01) |
| *B01D 69/12* | (2006.01) |
| *C02F 101/22* | (2006.01) |

(52) U.S. Cl.
CPC .......... *B01D 61/027* (2013.01); *B01D 69/08* (2013.01); *B01D 69/125* (2013.01); *B01D 71/69* (2022.08); *C02F 1/442* (2013.01); *C02F 2101/22* (2013.01); *C02F 2209/36* (2013.01); *C02F 2303/04* (2013.01)

(58) Field of Classification Search
None
See application file for complete search history.

(56) References Cited

U.S. PATENT DOCUMENTS 5,028,337 A * 7/1991 Linder ................. B01D 69/125
210/655

FOREIGN PATENT DOCUMENTS

| CN | 103861483 A | 6/2014 |
|---|---|---|
| CN | 104437105 A | 3/2015 |
| CN | 104524993 A | 4/2015 |
| CN | 104801209 A | 7/2015 |
| CN | 107970787 A | 5/2018 |
| CN | 110404419 A | 11/2019 |
| CN | 113559728 A | 10/2021 |
| JP | 2021194641 A | 12/2021 |

* cited by examiner

*Primary Examiner* — Krishnan S Menon
(74) *Attorney, Agent, or Firm* — Bayramoglu Law Offices LLC

(57) ABSTRACT

A low-pressure high-flux hollow fiber nanofiltration (NF) membrane, and a preparation method and use thereof are provided. The low-pressure high-flux hollow fiber NF membrane includes a base membrane and a negatively-charged separation layer formed on a surface of the base membrane, where a material of the separation layer is a crosslinking product of a negatively-charged sulfonated polymer. The low-pressure high-flux hollow fiber NF membrane of the present disclosure solves the technical problem that the hollow fiber NF membranes in the prior art are difficult to have both high performance and low energy consumption.

19 Claims, 1 Drawing Sheet

LOW-PRESSURE HIGH-FLUX HOLLOW FIBER NANOFILTRATION (NF) MEMBRANE, AND PREPARATION METHOD AND USE THEREOF

CROSS REFERENCE TO THE RELATED APPLICATIONS

This application is based upon and claims priority to Chinese Patent Application No. 202210390794.1, filed on Apr. 14, 2022, the entire contents of which are incorporated herein by reference.

TECHNICAL FIELD

The present disclosure belongs to the technical field of composite membrane materials, and specifically relates to a low-pressure high-flux hollow fiber nanofiltration (NF) membrane, and a preparation method and use thereof.

BACKGROUND

An NF membrane is a novel pressure-driven membrane with a separation technology and developed on the basis of a reverse osmosis (RO) membrane. Typical NF membranes have the following characteristics: (1) these NF membranes have a low retention rate usually of less than 70% for monovalent salts such as NaCl, and a high retention rate usually of 90% or more for divalent salts or multivalent salts, (2) the retention of soluble organic substances by these NF membranes may be affected by molecular sizes and shapes of the substances, and a molecular weight cut-off (MWCO) range of 100 to 1,000 is usually required, and (3) an operating pressure of an NF membrane is lower than an operating pressure of an RO membrane, and the operating pressure of the NF membrane is usually 0.5 MPa to 2.0 MPa. NF membranes have been widely used in fields such as food, medicine, environmental protection, and water resources.

Currently, the NF membrane products on the market are mainly polyamide (PA) NF membranes. Currently, a PA composite hollow fiber NF membrane generally includes a polysulfone (PSU)-based membrane and a PA separation layer formed through interfacial polymerization. A PSU-based membrane is formed through nonsolvent-induced phase separation (NIPS), and then an ultra-thin PA separation layer of 1 μm or less is formed on the PSU UF membrane substrate through interfacial polymerization of m-phenylenediamine or piperazine and a trimesoyl chloride (TMC) monomer at an oil-water interface to produce a PA NF membrane. Another hollow fiber NF membrane generally includes a PSU or polyethersulfone (PES) support layer and a polydielectric separation layer formed through layer-by-layer (LbL) self-assembly. The current hollow fiber NF membranes have disadvantages such as insufficient flux and intolerance to oxidation, and operating pressures of these hollow fiber NF membranes are mostly in a range of 0.7 MPa to 1.5 MPa and even reach 2 MPa. Therefore, it is one of the focuses of current research on NF membranes to develop high-performance low-pressure NF membrane products to improve the water flux and retention performance of membrane products and reduce the operating energy consumption.

Chinese patent application No. CN104437105A discloses a low-pressure hollow fiber NF membrane, including a PSU hollow fiber base membrane and a dense film formed on the base membrane, where the base membrane is dried and then soaked in a film-formation solution with an acrylic resin, a carboxyl chloroacetate resin, and diphenylmethane diisocyanate as solutes and butyl acetate and dimethyl carbonate (DMC) as solvents, such that a dense film is formed on the base membrane to obtain the low-pressure hollow fiber NF membrane. The low-pressure hollow fiber NF membrane in the Chinese patent application can effectively remove most of divalent ions and a small fraction of monovalent ions in water, and can also supplement trace minerals for the human body while allowing the effects of desalination and water purification. In addition, the NF membrane in the Chinese patent application can effectively improve a water yield and a water production of a household water purifier, where a water production can reach 100 L (m$^2$·h) to 200 L (m$^2$·h). The Chinese patent application allows a household water purifier to have an operating pressure of 0.2 MPa to 0.3 MPa, and due to the low-pressure operation of the household water purifier, an operating cost and a manufacturing cost of the household water purifier are also greatly reduced. However, the Chinese patent application is only suitable for household water purifiers, involves limited application conditions, has high requirements for a quality of water to be treated, and can hardly remove common viruses in water such as enteroviruses, noroviruses, hepatitis A virus (HAV), and adenoviruses. Although it is proposed that the Chinese patent application allows a detected water production to reach 100 L (m$^2$·h) to 200 L (m$^2$·h), specific conditions under which the water flux is detected are unclear. In addition, the Chinese patent application has deficiencies in ion retention, chlorine resistance, oxidation resistance, and other properties.

SUMMARY

In view of this, the present disclosure provides a low-pressure high-flux hollow fiber NF membrane, and a preparation method and use thereof. The present disclosure solves the technical problem that the hollow fiber NF membranes in the prior art are difficult to have high performance, low energy consumption, and oxidation resistance simultaneously.

A first technical solution of the present disclosure is as follows: A low-pressure high-flux hollow fiber NF membrane is provided, including a base membrane and a negatively-charged separation layer formed on a surface of the base membrane, where a material of the separation layer is a crosslinking product of a negatively-charged sulfonated polymer.

Preferably, the crosslinking product is obtained by forming a sulfamide crosslinking bond with a sulfonic acid group in a molecular chain of the sulfonated polymer as a crosslinking point.

Preferably, the sulfonated polymer is one or a mixture of two or more selected from the group consisting of sulfonated polysulfone (SPSU), sulfonated polyethersulfone (SPES), sulfonated polyetherketone (SPEK), sulfonated polyvinyl chloride (SPVC), sulfonated polyacrylonitrile (SPAN), sulfonated polyimide (SPI), sulfonated polyetherimide (SPEI), sulfonated polyvinylidene fluoride (SPVDF), and sulfonated cellulose (SC).

Preferably, the NF membrane is able to tolerate 200 ppm NaClO.

Preferably, a material of the base membrane is one or a mixture of two or more selected from the group consisting of PSU, PES, polyvinyl chloride (PVC), polyacrylonitrile (PAN), polyimide (PI), polyetherimide (PEI), polyvinylidene fluoride (PVDF), cellulose, polypropylene (PP), and polyethylene (PE).

Preferably, the separation layer has a thickness of 10 nm to 3,000 nm.

A second technical solution of the present disclosure is as follows: A preparation method of a low-pressure high-flux hollow fiber NF membrane is provided, including the following steps:

S1. preparing a base membrane;

S2. preparing a negatively-charged sulfonated polymer solution, and dip-coating the negatively-charged sulfonated polymer solution on an outer surface of the base membrane to form a coating on the outer surface of the base membrane; and S3. soaking the coating formed in S2 in a polyamine solution to allow a crosslinking reaction to form a separation layer.

Preferably, a polyamine is selected from the group consisting of ethylenediamine (EDA), hexamethylenediamine (HMDA), and p-phenylenediamine.

Preferably, in S2, the negatively-charged sulfonated polymer solution has a mass concentration of 0.1% to 20%;

S2 further includes: dip-coating the negatively-charged sulfonated polymer solution on the outer surface of the base membrane for 1 s to 30 min, taking the base membrane out, and heating at 50° C. to 100° C. to remove a solvent through evaporation to form the coating; and in S3, the polyamine solution has a mass concentration of 1% to 30%, and the crosslinking reaction is conducted for 30 min to 6 h.

A third technical solution of the present disclosure is as follows: A use of a low-pressure high-flux hollow fiber NF membrane in removal of viruses and virus fragments in water is provided, where the low-pressure high-flux hollow fiber NF membrane has a separation layer with a crosslinking product of a negatively-charged sulfonated polymer as a material.

Beneficial Effects

The low-pressure high-flux hollow fiber NF membrane provided by the present disclosure has a negatively-charged separation layer, and a material of the separation layer is a crosslinking product of a negatively-charged sulfonated polymer. The low-pressure high-flux hollow fiber NF membrane of the present disclosure has strong negative charges under neutral conditions. Compared with the existing PA hollow fiber NF membranes, the low-pressure high-flux hollow fiber NF membrane of the present disclosure has a slightly large pore size, can operate under a pressure of 0.5 MPa or lower, has a strong charging effect and a charge quantity that does not change with a pH, and exhibits a high salt retention rate and a high water flux. In addition, the NF membrane of the present disclosure has chlorine resistance and oxidation resistance, can resist free chlorine at a concentration of 200 ppm, and can also remove common viruses and virus fragments in water.

BRIEF DESCRIPTION OF THE DRAWINGS

To make the content of the present disclosure comprehensible and clear, the present disclosure is described in further detail below with reference to the specific examples and accompanying drawings of the present disclosure.

DETAILED DESCRIPTION OF THE EMBODIMENTS

Figure 1:
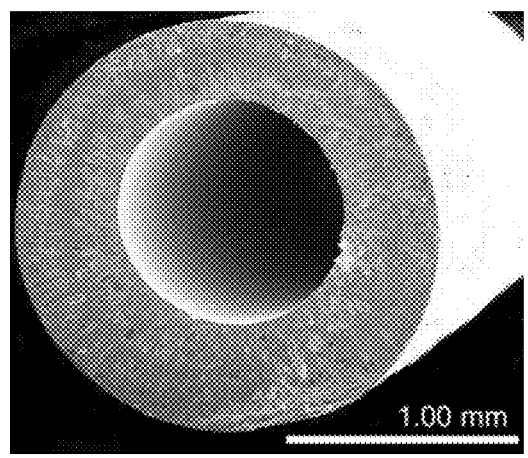
FIG. 1 is a scanning electron microscopy (SEM) image of a cross section of the hollow fiber NF base membrane prepared in Example 1 of the present disclosure.

In order to describe the technical contents, objectives, and effects of the present disclosure in detail, the present disclosure is described below with reference to implementations.

Unless otherwise specified, the reagents used in the specification are commercially available.

The present disclosure provides a low-pressure high-flux hollow fiber NF membrane, including a base membrane and a negatively-charged separation layer formed on a surface of the base membrane, where the base membrane is an NF membrane or an ultrafiltration (UF) membrane; a material of the separation layer is a crosslinking product of a negatively-charged sulfonated polymer, in which a sulfamide crosslinking bond is formed with a sulfonic acid group in a molecular chain of the sulfonated polymer as a crosslinking point; and the separation layer has a thickness of 10 nm to 3,000 nm.

The sulfonated polymer is one selected from the group consisting of SPSU, SPES, SPEK, SPVC, SPAN, SPI, SPEI, SPVDF, and SC.

A material of the base membrane is one selected from the group consisting of PSU, PES, PVC, PAN, PI, PEI, PVDF, cellulose, PP, and PE.

In the low-pressure high-flux hollow fiber NF membrane of the present disclosure, a combination of dip-coating and crosslinking is adopted to form a negatively-charged separation layer on a surface of a hollow fiber base membrane, that is, a coating is first formed through dip-coating on an outer surface of the base membrane, and then the coating is subjected to crosslinking to form the separation layer. A specific preparation method of the low-pressure high-flux hollow fiber NF membrane includes the following steps:

S1. Preparation of a base membrane through NIPS: A casting solution is prepared, subjected to bubble removal, and spun according to predetermined parameters to obtain a hollow fiber base membrane, and then the base membrane is heated and dried to remove moisture on a surface of the base membrane for later use.

S2. A negatively-charged sulfonated polymer solution with a mass concentration of 0.1% to 20% and preferably 0.5% to 5% is prepared as a dip-coating solution, and the hollow fiber base membrane is soaked in the sulfonated polymer solution for 1 s to 30 min and preferably 30 s to 180 s with an inner bore of the membrane blocked to make an outer surface of the hollow fiber base membrane in contact with the dip-coating solution, then taken out, and heated at 50° C. to 100° C. and preferably 70° C. to 90° C. to remove a solvent through evaporation, such that a coating with a thickness of 10 nm to 3,000 nm is formed on the surface of the base membrane.

S3. A hollow fiber base membrane with a sulfonated polymer coating on a surface of the base membrane is soaked in a polyamine solution to allow a crosslinking reaction for 30 min to 6 h and preferably 30 min to 180 min, such that a separation layer is formed on the outer surface, where the polyamine solution has a mass concentration of 1% to 30% and preferably 5% to 15% and a polyamine is selected from the group consisting of EDA, HMDA, and p-phenylenediamine.

In the present disclosure, S2 and S3 may be repeated one or more times.

An important use of the low-pressure high-flux hollow fiber NF membrane of the present disclosure is removal of viruses and virus fragments in water. The virus contamination in drinking water and the infectious diseases caused by the virus contamination are important indexes for control of microbial safety risks in drinking water. The types and characteristics of common viruses in water are listed in Table 1 below. Drinking water disinfection technologies include addition of chemical disinfectants (such as chlorine, chloramines, chlorine dioxide, and ozone), application of physical ultraviolet (UV) radiation, or the like. It is stated in the *National Primary Drinking Water Regulations* (*NPDWR*) of the U.S Environmental Protection Agency (USEPA) that a detected virus concentration value in drinking water should be zero; and an actual water treatment is conducted with reference to a limit method of a performance objective of the World Health Organization (WHO), and a drinking water treatment process is required to allow an enterovirus inactivation rate of 4 logarithmic units (namely, 99.99%). These disinfection methods have disadvantages such as high cost and even chemical residues. These disadvantages can be avoided when a membrane technology is adopted. The hollow fiber NF membrane has a pore size generally of less than 1 nm. A physical size of a virus is generally greater than 20 nm, and in actual situations, there are virus fragments of a smaller size in water. Therefore, in any case, the hollow fiber NF membrane can intercept all kinds of viruses. When a surface of the hollow fiber NF membrane is negatively charged, viruses and virus fragments in water are also negatively charged under neutral conditions, and thus the hollow fiber NF membrane can repel the viruses and virus fragments in water.

TABLE 1

Types and characteristics of common viruses in water

| Virus | Molecular biological characteristics | Latent period/d | Infection symptoms | Immune persistence |
|---|---|---|---|---|
| Enterovirus | Single-stranded positive-stranded RNA virus, capsid: icosahedral cubic symmetry, no envelope, diameter: 20 nm to 30 nm | 2-14 | Gastrointestinal problems, central nervous system damage, myocardial damage | Durable specific immunity |
| Norovirus | Single-stranded positive-stranded RNA virus, spherical, icosahedral symmetry, no envelope, diameter: about 40 nm | 1-2 | Acute diarrhea | <1 a |
| HAV | Single-stranded positive-stranded RNA virus, icosahedral cubic symmetry, no envelope, diameter: about 27 nm | 15-45 | Fever, nausea, abdominal discomfort, hepatitis symptoms | Lifelong immunity |
| Adenovirus | Double-stranded DNA virus, icosahedral symmetry, no envelope, diameter: about 80 nm | 2-21 | Respiratory diseases, gastroenteritis, eye infections | Durable immunity for homoviruses |
| Rotavirus | Double-stranded RNA virus, protein capsid with three layers of icosahedrons, no envelope, diameter: about 70 nm | 2-3 | Fever, vomiting, diarrhea | Non-durable immunity for homoviruses |
| Coronavirus | Single-stranded positive-stranded RNA virus, polymorphic, envelope with spinous processes, diameter: 80 nm to 200 nm | 2-14 | Fever, gastrointestinal problems, cough, respiratory infections | Repeated infection is possible and immunization is difficult. |

For the low-pressure high-flux hollow fiber NF membrane of the present disclosure, a flux and a retention rate can be adjusted by adjusting a dip-coating time, a concentration of a dip-coating solution, a crosslinking time, and a concentration of a crosslinking solution, such that the low-pressure high-flux hollow fiber NF membrane is suitable for different application scenarios.

The separation layer of the low-pressure high-flux hollow fiber NF membrane in the present disclosure carries strong negative charges, and has a charge quantity that does not change with a pH.

A negatively-charged SPES coating is formed on a surface of a base membrane and then crosslinked with EDA to produce a separation layer, such that the low-pressure high-flux hollow fiber NF membrane of the present disclosure is obtained; and the obtained hollow fiber NF membrane has oxidation resistance and chlorine resistance, and can tolerate 200 ppm NaClO as tested.

The low-pressure high-flux hollow fiber NF membrane of the present disclosure can remove viruses and virus fragments in water.

The low-pressure high-flux hollow fiber NF membrane of the present disclosure has a water flux of higher than 40 LMH/bar and an $MgSO_4$ retention rate of higher than 90%.

Example 1

In this example, a hollow fiber NF membrane was provided, and a preparation method of the hollow fiber NF membrane was as follows:

S1. Preparation of a hollow fiber base membrane through NIPS: A casting solution was prepared at 80° C. with 22% of PVDF, 73% of the solvent N-methylpyrrolidone (NMP), and 5% of polyethylene glycol (PEG), then subjected to bubble removal, and spun according to the parameters shown in Table 2 to obtain the PVDF hollow fiber base membrane; and the hollow fiber base membrane was heated and dried to remove moisture on a surface of the base membrane for later use.

TABLE 2

Parameters for preparation of the hollow fiber base membrane

| Parameters of membrane spinning | |
| --- | --- |
| Size of a spinning nozzle (outer diameter/inner diameter) | 1.4/0.7 mm |
| Temperature of the spinning nozzle | 55° C. |
| Composition of a core solution | Water:NMP = 7:3 |
| Outer gel bath | Water:NMP = 9:1 |
| Temperature of the outer gel bath | 15° C. |
| Height of an air segment | 75 cm |

S2. Preparation of a negatively-charged sulfonated polymer solution as a dip-coating solution: 5.5% SPES was dissolved in ethylene glycol monomethyl ether (EGME).

The PVDF hollow fiber base membrane was soaked in the SPES dip-coating solution for 3 min with an inner bore of the membrane blocked, such that an outer surface of the hollow fiber base membrane was in contact with the dip-coating solution.

The hollow fiber base membrane was taken out from the dip-coating solution, and then heated at 75° C. to remove a solvent through evaporation, such that an SPES coating was formed on the outer surface of the hollow fiber base membrane.

S3. The hollow fiber membrane obtained in S2 was soaked in a 5% HMDA solution to allow a crosslinking reaction for 3 h to form a separation layer.

Thus, the low-pressure high-flux hollow fiber NF membrane product of this example was obtained.

Figure 2:
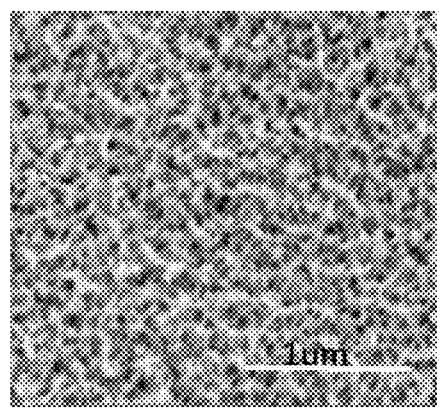
FIG. 2 is an SEM image of an outer surface of the hollow fiber NF base membrane prepared in Example 1 of the present disclosure.
Figure 3:
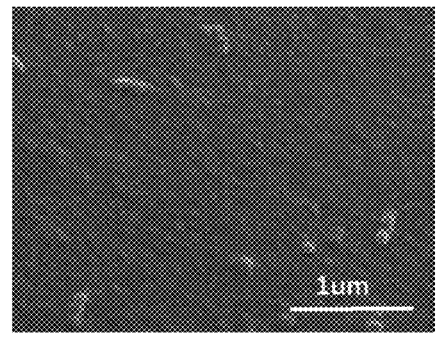
FIG. 3 is an SEM image of an outer surface of the hollow fiber NF membrane prepared in Example 1 of the present disclosure.

FIG. 1 is an SEM image of a cross section of the PVDF hollow fiber base membrane in this example, and a dense membrane layer can be observed from this image. FIG. 2 is an SEM image of an outer surface of the base membrane, and it can be seen from this image that the membrane has clear pores and high porosity, and a pore size of the membrane belongs to a UF membrane. FIG. 3 is an SEM image of an outer surface of the hollow fiber NF membrane, and it can be seen from this image that pores of the base membrane (as shown in FIG. 2) are completely covered by the SPES separation layer. A pore size of the separation layer cannot be observed by SEM.

In this example, the hollow fiber NF membrane has a NaCl retention rate of 57.8%, a $MgSO_4$ retention rate of 91.9%, and a water flux of 56 LMH, and measurement conditions are as follows: 500 ppm NaCl, 500 ppm $MgSO_4$, 1 bar, and 25° C., indicating that the hollow fiber NF membrane in this example has a very high flux and an excellent divalent salt retention capacity. In order to verify the oxidation resistance of the hollow fiber NF membrane, membrane filaments were soaked in a 200 ppm sodium hypochlorite solution for 15 d, then changes in the retention rate and flux were investigated, and measurement results were shown in Table 3. After the membrane filaments were soaked in the sodium hypochlorite solution, the retention rate and flux remained unchanged, indicating that the NF membrane in this example has oxidation resistance and chlorine resistance.

Example 2

In this example, an impact of a concentration of a dip-coating solution was illustrated. This example was the same as Example 1, except that 8.5% SPES was dissolved in EGME.

The hollow fiber NF membrane of this example has a NaCl retention rate of 68.3%, a $MgSO_4$ retention rate of 98.1%, and a water flux of 91 LMH, and measurement conditions are as follows: 500 ppm NaCl, 500 ppm $MgSO_4$, 1 bar, and 25° C., indicating that, compared with Example 1, the hollow fiber NF membrane of this example has a decrease in the flux and an increase in the salt retention rate. This is because an increase in a concentration of a dip-coating solution leads to a corresponding increase in a thickness of an SPES coating. In order to verify the oxidation resistance of the hollow fiber NF membrane, membrane filaments were soaked in a 200 ppm sodium hypochlorite solution for 15 d, then changes in the retention rate and flux were investigated, and measurement results were shown in Table 3. After the membrane filaments were soaked in the sodium hypochlorite solution, the retention rate and flux remained unchanged, indicating that the NF membrane has oxidation resistance and chlorine resistance.

Example 3

In this example, impacts of different base membrane materials were illustrated. This example was the same as Example 1, except that a casting solution was prepared at 50° C. with 19% of PES, 68% of the solvent NMP, and 13% of methanol, then subjected to bubble removal, and spun.

The hollow fiber NF membrane of this example has a NaCl retention rate of 46.7%, a $MgSO_4$ retention rate of 92.6%, and a water flux of 108 LMH, and measurement conditions are as follows: 500 ppm NaCl, 500 ppm $MgSO_4$, 1 bar, and 25° C., indicating that the hollow fiber NF membrane has a very high flux and an excellent divalent salt retention capacity. In order to verify the oxidation resistance of the hollow fiber NF membrane, membrane filaments were soaked in a 200 ppm sodium hypochlorite solution for 15 d, then changes in the retention rate and flux were investigated, and measurement results were shown in Table 3. After the membrane filaments were soaked in the sodium hypochlorite solution, the retention rate and flux remained unchanged, indicating that the NF membrane has oxidation resistance and chlorine resistance.

Example 4

In this example, impacts of different crosslinking agents were illustrated. This example was the same as Example 3, except that EDA was used instead of HMIDA.

The hollow fiber NF membrane of this example has a NaCl retention rate of 43.5%, a $MgSO_4$ retention rate of 92.1%, and a water flux of 111 LMH, and measurement conditions are as follows: 500 ppm NaCl, 500 ppm $MgSO_4$, 1 bar, and 25° C., indicating that the hollow fiber NF membrane has a very high flux and an excellent divalent salt retention capacity, and the membrane has similar performance to the membrane in Example 3. In order to verify the oxidation resistance of the hollow fiber NF membrane, membrane filaments were soaked in a 200 ppm sodium hypochlorite solution for 15 d, then changes in the retention rate and flux were investigated, and measurement results were shown in Table 3. After the membrane filaments were soaked in the sodium hypochlorite solution, the retention rate and flux remained unchanged, indicating that the NF membrane has oxidation resistance and chlorine resistance.

Example 5

In this example, impacts of different crosslinking agent concentrations were illustrated. This example was the same as Example 4, except that the crosslinking agent EDA had a concentration of 7.5%.

The hollow fiber NF membrane of this example has a NaCl retention rate of 59.5%, a $MgSO_4$ retention rate of 97.9%, and a water flux of 103 LMH, and measurement conditions are as follows: 500 ppm NaCl, 500 ppm $MgSO_4$, 1 bar, and 25° C., indicating that, with the increase of a crosslinking agent concentration, a flux of the membrane decreases and a salt retention rate of the membrane increases. In order to verify the oxidation resistance of the hollow fiber NF membrane, membrane filaments were soaked in a 200 ppm sodium hypochlorite solution for 15 d, then changes in the retention rate and flux were investigated, and measurement results were shown in Table 1. After the membrane filaments were soaked in the sodium hypochlorite solution, the retention rate and flux remained unchanged, indicating that the NF membrane has oxidation resistance and chlorine resistance.

Example 6

In this example, an impact of a dip-coating polymer was illustrated. This example was the same as Example 3, except that SPSU was used instead of SPES.

The hollow fiber NF membrane of this example has a NaCl retention rate of 51.7%, a $MgSO_4$ retention rate of 95.6%, and a water flux of 110 LMH, and measurement conditions are as follows: 500 ppm NaCl, 500 ppm $MgSO_4$, 1 bar, and 25° C., indicating that the hollow fiber NF membrane has a very high flux and an excellent divalent salt retention capacity, and the membrane has similar performance to the membrane in Example 3. In order to verify the oxidation resistance of the hollow fiber NF membrane, membrane filaments were soaked in a 200 ppm sodium hypochlorite solution for 15 d, then changes in the retention rate and flux were investigated, and measurement results were shown in Table 3. After the membrane filaments were soaked in the sodium hypochlorite solution, the retention rate and flux remained unchanged, indicating that the NF membrane has oxidation resistance and chlorine resistance.

Example 7

In this example, the preparation of double separation layers and an impact of the double separation layers on the performance of the membrane were illustrated. This example was the same as Example 6, except that steps 3, 4, 5, and 6 were repeated once.

The hollow fiber NF membrane of this example has a NaCl retention rate of 81.9%, an $MgSO_4$ retention rate of 99.1%, and a water flux of 79 LMH, and measurement conditions are as follows: 500 ppm NaCl, 500 ppm $MgSO_4$, 1 bar, and 25° C. The hollow fiber NF membrane of this example has a flux only half a flux of the membrane in Example 6, but exhibits a salt retention rate much higher than a salt retention rate of the membrane in Example 6. This is because the double separation layers are formed on a surface of the base membrane. In order to verify the oxidation resistance of the hollow fiber NF membrane, membrane filaments were soaked in a 200 ppm sodium hypochlorite solution for 15 d, then changes in the retention rate and flux were investigated, and measurement results were shown in Table 3. After the membrane filaments were soaked in the sodium hypochlorite solution, the retention rate and flux remained unchanged, indicating that the NF membrane has oxidation resistance and chlorine resistance.

Test 1

The hollow fiber NF membranes prepared in Examples 1 to 7 each were subjected to performance and chemical stability tests. Membrane filaments were soaked in a 200 ppm sodium hypochlorite solution for 15 d, then changes in the retention rate and flux were investigated, and results were shown in Table 3 below.

TABLE 3

Test results of performance and chemical stability of the hollow fiber NF membranes obtained in Examples 1 to 7

Test conditions: operating pressure: 1 bar, temperature: 25° C., pH: 7.5, and concentration of a $MgSO_4$ solution: 500 ppm

| | Flux, LMH | | $MgSO_4$ retention | |
| --- | --- | --- | --- | --- |
| | Original sample | 200 ppm Before NaClO soaking | Original sample | 200 ppm After NaClO soaking |
| Example 1 | 51 | 53 | 91.9% | 92.0% |
| Example 2 | 42 | 43 | 98.1% | 97.7% |
| Example 3 | 49 | 51 | 92.6% | 92.1% |
| Example 4 | 50 | 53 | 92.1% | 92.0% |
| Example 5 | 46 | 49 | 97.9% | 97.4% |
| Example 6 | 48 | 49 | 95.6% | 95.4% |
| Example 7 | 36 | 37 | 99.1% | 98.7% |

Test 2

The hollow fiber NF membrane prepared in Example 3 was used to treat phage MS2-containing tap water. The phage MS2 was similar to HAV in physical sizes and shapes, and thus the phage MS2-containing tap water could be used to simulate HAV-containing tap water. A concentration of the phage MS2 in the experimental tap water was $10^7$ pfu/mL, and after the tap water was treated with the hollow fiber NF membrane prepared in Example 3 at 2 bar and 37° C., no viruses or virus fragments could be detected in the tap water, indicating that the hollow fiber NE membrane of the present disclosure can completely remove viruses and virus fragments in the tap water.

The above examples and tests fully indicate that the hollow fiber NE membrane of the present disclosure has excellent performance: oxidation resistance, chlorine resistance, high flux, and excellent salt retention; and the hollow fiber NF membrane of the present disclosure can completely remove viruses and virus fragments in water.

Apparently, the above examples are merely listed for clear description, and are not intended to limit the implementations. Those of ordinary skill in the art may make modifications or variations in other forms based on the above description. There are no need and no way to exhaust all the implementations. Obvious changes or variations made thereto shall still fall within the protection scope of the present disclosure.

What is claimed is:

1. A preparation method of a low-pressure high-flux hollow fiber nanofiltration (NF) membrane, comprising the following steps:
   S1: preparing a base membrane;
   S2: preparing a negatively-charged sulfonated polymer solution, and dip-coating the negatively-charged sulfonated polymer solution on an outer surface of the base membrane for 1 s to 30 min to contact the outer surface of the base membrane with the negatively-charged sulfonated polymer solution, taking a dip-coated base membrane out, and heating the dip-coated base membrane at 50° C. to 100° C. to remove a solvent through an evaporation to form a coating on the outer surface of the base membrane; and
   S3: soaking the coating formed in S2 in a polyamine solution to allow a crosslinking reaction to form a separation layer;
   wherein
   a polyamine in the polyamine solution is selected from the group consisting of ethylenediamine (EDA), hexamethylenediamine (HMDA), and p-phenylenediamine;
   the crosslinking reaction is to form a sulfamide crosslinking bond with a sulfonic acid group in a molecular chain of a sulfonated polymer as a crosslinking point.

2. The preparation method of the low-pressure high-flux hollow fiber NF membrane according to claim 1, wherein in S2, the negatively-charged sulfonated polymer solution has a mass concentration of 0.1% to 20%.

3. The preparation method of the low-pressure high-flux hollow fiber NF membrane according to claim 1, wherein in S3, the polyamine solution has a mass concentration of 1% to 30%, and the crosslinking reaction is conducted for 30 min to 6 h.

4. The low-pressure high-flux hollow fiber NF membrane according to claim 1, wherein the low-pressure high-flux hollow fiber NF membrane is configured to tolerate 200 ppm NaClO.

5. The low-pressure high-flux hollow fiber NF membrane according to claim 1, wherein the sulfonated polymer is one or a mixture of two or more selected from the group consisting of sulfonated polysulfone (SPSU), sulfonated polyethersulfone (SPES), sulfonated polyetherketone (SPEK), sulfonated polyvinyl chloride (SPVC), sulfonated polyacrylonitrile (SPAN), sulfonated polyimide (SPI), sulfonated polyetherimide (SPEI), sulfonated polyvinylidene fluoride (SPVDF), and sulfonated cellulose (SC).

6. The low-pressure high-flux hollow fiber NF membrane according to claim 1, wherein a material of the base membrane is one or a mixture of two or more selected from the group consisting of polysulfone (PSU), polyethersulfone (PES), polyvinyl chloride (PVC), polyacrylonitrile (PAN), polyimide (PI), polyetherimide (PEI), polyvinylidene fluoride (PVDF), cellulose, polypropylene (PP), and polyethylene (PE).

7. The low-pressure high-flux hollow fiber NF membrane according to claim 1, wherein the separation layer has a thickness of 10 nm to 3,000 nm.

8. A method of using the low-pressure high-flux hollow fiber NF membrane according to claim 4, comprising the step of removal of viruses and virus fragments from water by filtering therethrough.

9. The low-pressure high-flux hollow fiber NF membrane according to claim 2, wherein the low-pressure high-flux hollow fiber NF membrane is configured to tolerate 200 ppm NaClO.

10. The low-pressure high-flux hollow fiber NF membrane according to claim 3, wherein the low-pressure high-flux hollow fiber NF membrane is configured to tolerate 200 ppm NaClO.

11. The low-pressure high-flux hollow fiber NF membrane according to claim 2, wherein the sulfonated polymer is one or a mixture of two or more selected from the group consisting of sulfonated polysulfone (SPSU), sulfonated polyethersulfone (SPES), sulfonated polyetherketone (SPEK), sulfonated polyvinyl chloride (SPVC), sulfonated polyacrylonitrile (SPAN), sulfonated polyimide (SPI), sulfonated polyetherimide (SPEI), sulfonated polyvinylidene fluoride (SPVDF), and sulfonated cellulose (SC).

12. The low-pressure high-flux hollow fiber NF membrane according to claim 3, wherein the sulfonated polymer is one or a mixture of two or more selected from the group consisting of sulfonated polysulfone (SPSU), sulfonated polyethersulfone (SPES), sulfonated polyetherketone (SPEK), sulfonated polyvinyl chloride (SPVC), sulfonated polyacrylonitrile (SPAN), sulfonated polyimide (SPI), sulfonated polyetherimide (SPEI), sulfonated polyvinylidene fluoride (SPVDF), and sulfonated cellulose (SC).

13. The low-pressure high-flux hollow fiber NF membrane according to claim 2, wherein a material of the base membrane is one or a mixture of two or more selected from the group consisting of polysulfone (PSU), polyethersulfone (PES), polyvinyl chloride (PVC), polyacrylonitrile (PAN), polyimide (PI), polyetherimide (PEI), polyvinylidene fluoride (PVDF), cellulose, polypropylene (PP), and polyethylene (PE).

14. The low-pressure high-flux hollow fiber NF membrane according to claim 3, wherein a material of the base membrane is one or a mixture of two or more selected from the group consisting of polysulfone (PSU), polyethersulfone (PES), polyvinyl chloride (PVC), polyacrylonitrile (PAN), polyimide (PI), polyetherimide (PEI), polyvinylidene fluoride (PVDF), cellulose, polypropylene (PP), and polyethylene (PE).

15. The low-pressure high-flux hollow fiber NF membrane according to claim 2, wherein the separation layer has a thickness of 10 nm to 3,000 nm.

16. The low-pressure high-flux hollow fiber NF membrane according to claim 3, wherein the separation layer has a thickness of 10 nm to 3,000 nm.

17. A method of using the low-pressure high-flux hollow fiber NF membrane according to claim 5, comprising the step of removal of viruses and virus fragments from water by filtering therethrough.

18. A method of using the low-pressure high-flux hollow fiber NF membrane according to claim 6, comprising the step of removal of viruses and virus fragments from water by filtering therethrough.

19. A method of using the low-pressure high-flux hollow fiber NF membrane according to claim 7, comprising the step of removal of viruses and virus fragments from water by filtering therethrough.

* * * * *